May 31, 1949.  K. K. BRUECKNER  2,471,478
FLEXIBLE ELECTRODE FOR WELDING
Filed June 14, 1947
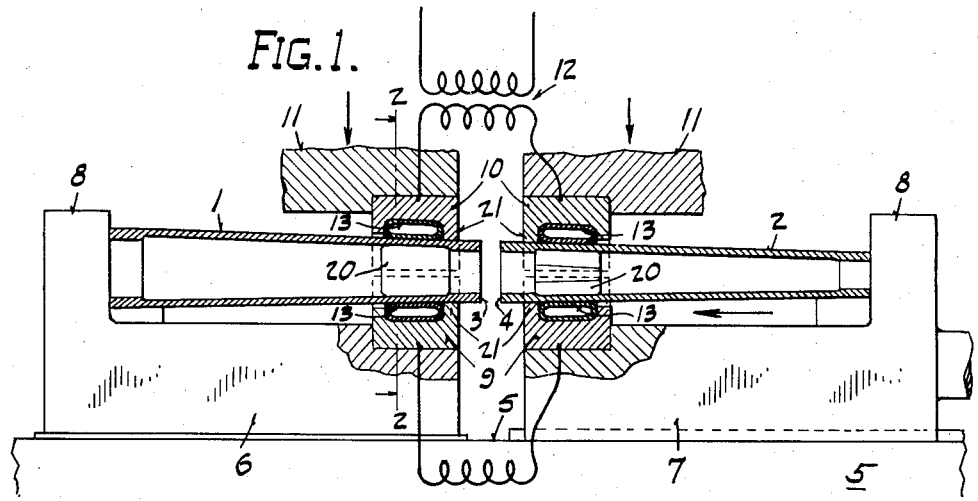
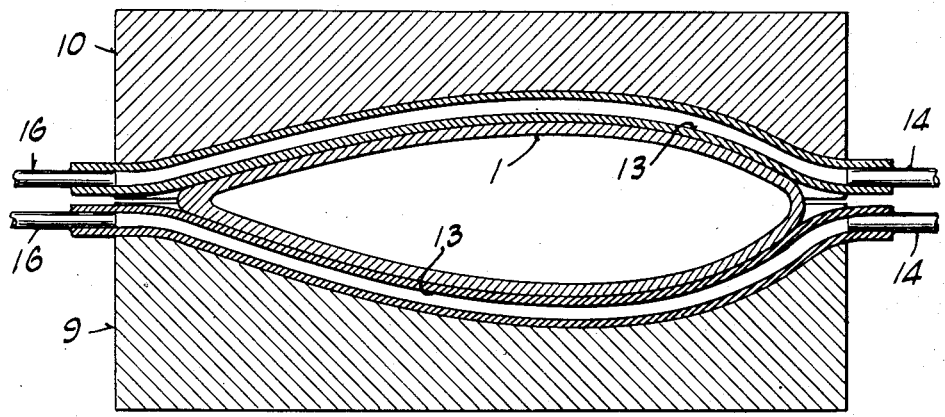
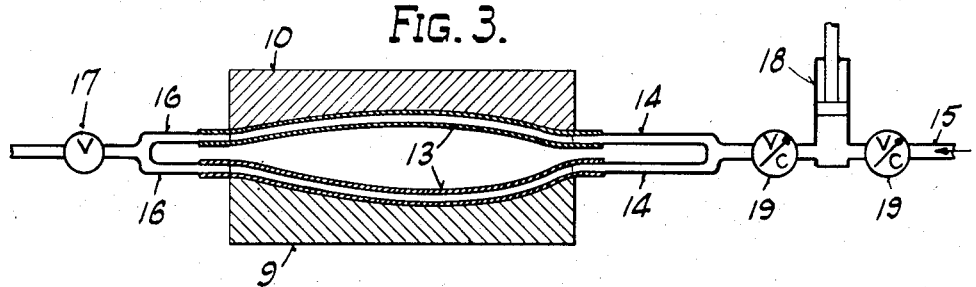
INVENTOR.
Karl K. Brueckner
BY
ATTORNEY.

Patented May 31, 1949

2,471,478

UNITED STATES PATENT OFFICE 2,471,478

FLEXIBLE ELECTRODE FOR WELDING

Karl K. Brueckner, Milwaukee, Wis., assignor to A. O. Smith Corporation, Milwaukee, Wis., a corporation of New York Application June 14, 1947, Serial No. 754,613

7 Claims. (Cl. 219—4)

This invention relates to a flexible electrode for electric welding.

In mass production of metal blanks to be welded together end to end as by flash or resistance welding it is impossible to produce blanks of the same surface contour, and a rigid electrode die contacts only the high spots on the blank surface. This results in variable heatings of different blanks and, consequently, variable welds.

In order to remedy this condition the principal object of the invention is to provide a flexible electrode to engage the work in intimate contact for uniform heating of the portion to be welded.

Another object of the invention is to provide a flexible electrode die in the welding of blanks of irregular shape or having surface irregularities to accomplish uniform heating of the part to be welded.

A further object is to provide a flexible electrode for heating of workpieces to be welded together to better control the time for flashing and heating.

Another object of the invention is to provide a uniform heat line in the edge portions to be welded.

Another object is to provide a flexible electrode for welding to obtain more uniform welds between workpieces in mass production operations.

These and other objects of the invention will appear hereinafter in connection with the following description of the accompanying drawing illustrating an embodiment of the invention.

In the drawing:

Figure 1 is a longitudinal sectional view of two tubular blanks assembled for welding together and showing the flexible electrodes of the invention;

Fig. 2 is an enlarged view taken on line 2—2 of Figure 1; and

Fig. 3 is a diagrammatic view showing operation of the electrode die for welding and cooling.

In order to illustrate the invention, in the drawing there are shown two propeller blade sections 1 and 2 whose edges 3 and 4 respectively have been prepared for flash welding together. Sections 1 and 2 have the surface irregularities normally found in production and also are of irregular shape.

Blade sections 1 and 2 are longitudinally assembled within a welding machine with their edges 3 and 4 in welding position. The machine has the bed 5, on which are mounted a fixed clamp 6 and a movable clamp 7, the latter for moving the blade sections into contact as indicated by the arrow. The upright members 8 on each of the clamps engage sections 1 and 2 at their outer ends to hold the sections in place under the welding pressure.

The sections are gripped near the edges to be welded by the lower electrodes 9 and the upper electrodes 10 of each clamp. The electrodes are removable inserts so that they may be replaced or repaired.

The upper electrode dies 10 are secured within the pressure applying member 11 for bringing the die into welding position as will be described.

Dies 10 for each blade section are electrically connected to a source of electricity as shown at 12 for the flow of current therethrough to accomplish the electric welding of the edges 3 and 4 of sections 1 and 2.

The electrode dies 9 and 10 are provided with a suitable cavity to receive the flattened flexible tube 13 comprising the flexible electrode of the invention. The tube is of copper or other material which serves as a good conductor of electricity and is secured within each die as by silver solder or the like.

Each tube 13, as shown in Fig. 2 is open at both ends and the ends of the tubes project through apertures in the dies and outwardly therefrom a slight distance. A flexible hose 14 is suitably secured within the inlet end of each tube 13 to carry water thereto from the source of supply 15 as shown in Fig. 3. The water is carried off from tubes 13 by a hose 16 suitably secured within the outlet end of each tube.

Between welding operations the water flows freely through the tubes to cool the dies. When the welding operation is to be accomplished the outlet hoses 16 are closed by valve 17 and pressure in tubes 13 is built up by operation of pump 18 in the supply line leading from the water supply source to the inlet hoses 14 connected to the inlets of tubes 13. Suitable check valves 19 are provided in the inlet line on either side of pump 18 to prevent backflow of water to the source of supply and to the pump after the fluid pressure in tubes 13 is established.

The water under pressure from pump 18 tends to expand the flexible or resilient tubes into uniform and intimate contact with the irregular surfaces with which the tube comes into contact when the die 10 is placed under pressure from member 11 and the sections are clamped between dies 9 and 10. The tubes thus provide a perfect electrical contact or path for the passage of electrical current to the sections to be welded.

Water as from a city water supply has been found to be the safest and most economical fluid to employ as oil or other inflammable fluids are hazardous in the event the tubes 13 are ruptured. The showing in Fig. 3 is merely for purposes of illustration. In actual practice the flow of water through tubes 13 for cooling and placing the same under pressure during the welding operation for uniform electrical contact with the workpieces, is automatically operated and controlled.

A mandrel 20 may be employed in each blade section to prevent collapse thereof by the electrode pressure.

The forward or leading edge of each die 9 and 10 has a narrow ridge contact surface 21 to initially clamp sections 1 and 2 and align edges 3 and 4 when member 11 applies pressure to the dies. A portion of the welding current also flows through ridge 21 to assist tubes 13 in carrying the current to the workpieces.

In welding edges 3 and 4 of sections 1 and 2 the usual procedure is to clamp the sections between dies 9 and 10 on each piece by placing upper dies 10 under pressure from member 11 and bringing ridges 21 of dies 9 and 10 into engagement with the sections. This aligns the edges of sections 1 and 2.

The water in each tube 13 is then placed under pressure to expand the tubes into intimate contact with sections 1 and 2 by closing valve 17 and operating pump 18. The welding current is then switched on and flows through the flexible electrodes or tubes 13 and into the sections and across edges 3 and 4 to heat the edges and accomplish the welding of sections 1 and 2 together either by a flash or resistance welding operation.

When the welding of sections 1 and 2 is completed and the current is cut off then valve 17 is opened and water flows freely through tubes 13 from water supply source 15 to cool the insert dies within which they are secured preparatory to carrying out another welding operation.

The invention provides a flexible electrode that insures uniform current flow and uniform welding by intimate engagement of the electrode with the surfaces of workpieces to be joined together which may be of irregular contour or have surface irregularities that would interrupt current flow from a rigid electrode.

It has been found that where with a solid electrode there may be only ten per cent contact with the work, the flexible electrodes of the invention provide ninety to ninety-five per cent contact. The heat line along the edges to be welded consequently is generally straight and uniform compared to the irregular line where solid electrodes are employed.

The invention also eliminates special holes in the dies for cooling.

Although the invention is shown as applied to propeller blade sections it is also employable with substantially any metal articles whose edges are to be joined by electric welding.

Various embodiments of the invention may be employed within the scope of the accompanying claims.

I claim:

1. An electrode for the electric welding of metal articles, comprising a flexible electrically conductive member, hydraulic means to force said member into intimate contact with the article to be welded for uniform heating of the article by electric current carried thereto by said member to accomplish a uniform welding of articles.

2. An electrode for the electric welding of metal articles, comprising an electrically conductive flexible tube, means to expand said tube under internal pressure into intimate contact with the article to be welded for uniform heating of the same by electric current carried thereto by said tube to accomplish a uniform welding of articles.

3. An electrode for application to articles of irregular surface contour, comprising a flexible electrically conductive member assembled with the article to be welded, and means to expand said flexible member into intimate contact with the surface of said article to carry electric current to all surfaces of the article with which the flexible member is brought into contact to uniformly heat the article at the portion to be welded and accomplish a uniform welding of articles.

4. An electrode die for uniform welding of metal articles by electric welding, comprising a solid die member having edges rigidly clamping the article to be welded to align the edge thereof with the edge of an adjacent article similarly clamped, a die cavity internally of said die member, a flexible electrically conductive member secured in said die cavity, and means to expand said flexible member into uniform intimate surface to surface contact with the article to be welded to uniformly carry electric current to the edge portion to be welded to accomplished uniform welding of articles.

5. An electrode die for uniform welding of metal articles by electric welding, comprising a solid die member having edges rigidly clamping the article to be welded to align the edge thereof with the edge of an adjacent article similarly clamped, a die cavity internally of said die member, and a flexible electrically conductive tube secured in said die cavity and adapted to be expanded under internal pressure into intimate surface to surface contact with the article to be welded to uniformly carry electric current to the edge portion to be welded to accomplish uniform welding of articles.

6. An electrode die for uniform welding of metal articles by electric welding, comprising a solid die member having edges rigidly clamping the article to be welded to align the edge thereof with the edge of an adjacent article similarly clamped, a die cavity internally of said die member, and a flexible electrically conductive tube secured in said die cavity, means to expand said tube by internal water pressure into intimate surface to surface contact with the article to be welded to uniformly carry electric current to the edge portion to be welded to accomplish uniform welding of articles, and means to close off said tube after the welding operation to cool the die after the welding operation is completed.

7. An electrode die for uniform welding of metal articles by electric welding, comprising a solid die member having edges rigidly clamping the article to be welded to align the edge thereof with the edge of an adjacent article similarly clamped, a die cavity internally of said die member, and a flexible copper tube soldered to the die within said die cavity and adapted to be expanded under internal pressure into intimate surface to surface contact with the article to be welded to uniformly carry electric current to the edge portion to be welded to accomplish uniform welding of articles.

KARL K. BRUECKNER.

REFERENCES CITED

The following references are of record in the file of this patent:

UNITED STATES PATENTS

| Number | Name | Date |
| --- | --- | --- |
| 475,191 | Burton et al. | May 17, 1892 |
| 2,366,164 | Weick et al. | Jan. 2, 1945 |